United States Patent
Phan et al.

(10) Patent No.: US 8,806,433 B2
(45) Date of Patent: Aug. 12, 2014

(54) METHOD AND FRAMEWORK FOR SOFTWARE DEVELOPMENT

(75) Inventors: Nhan Van Phan, San Francisco, CA (US); Michael Benjamine Selkowe Fertik, Palo Alto, CA (US); Thomas Gerardo Dignan, Mountain View, CA (US); Cheng-chao Yang, Palo Alto, CA (US); Therani Madhusudan, San Jose, CA (US)

(73) Assignee: Reputation.com, Redwood City, CA (US)

( * ) Notice: Subject to any disclaimer, the term of this patent is extended or adjusted under 35 U.S.C. 154(b) by 0 days.

(21) Appl. No.: 13/282,673

(22) Filed: Oct. 27, 2011

(65) Prior Publication Data

US 2013/0111436 A1  May 2, 2013

(51) Int. Cl.
*G06F 9/44* (2006.01)
*G06F 9/46* (2006.01)

(52) U.S. Cl.
CPC ... *G06F 8/34* (2013.01); *G06F 8/20* (2013.01)
USPC ............................. 717/120; 717/127; 719/315

(58) Field of Classification Search
CPC ............... G06F 8/10; G06F 8/20; G06F 8/30; G06F 8/34; G06F 8/36; G06F 8/71; G06F 8/33
See application file for complete search history.

(56) References Cited

U.S. PATENT DOCUMENTS

| | | | | |
|---|---|---|---|---|
| 6,029,207 | A * | 2/2000 | Heninger | 719/331 |
| 7,747,561 | B1 * | 6/2010 | Gupta et al. | 707/999.204 |
| 2002/0040410 | A1 * | 4/2002 | Leach et al. | 709/315 |
| 2003/0226132 | A1 * | 12/2003 | Tondreau et al. | 717/116 |
| 2006/0136921 | A1 * | 6/2006 | Becker et al. | 718/100 |
| 2008/0098354 | A1 * | 4/2008 | Chen et al. | 717/120 |
| 2008/0184140 | A1 * | 7/2008 | Koerner | 715/762 |
| 2011/0066999 | A1 * | 3/2011 | Rabinovich et al. | 717/104 |
| 2012/0159428 | A1 * | 6/2012 | Park et al. | 717/104 |

FOREIGN PATENT DOCUMENTS

EP        774756 A2 *  5/1997  .......... G11B 27/034

* cited by examiner

*Primary Examiner* — Don Wong
*Assistant Examiner* — Mohammad Kabir
(74) *Attorney, Agent, or Firm* — Finnegan, Henderson, Farabow, Garrett & Dunner, L.L.P.

(57) ABSTRACT

Presented are systems and methods of operation for a framework system. The framework system acquires software code and modularizes the software code to create an associated modular code, wherein the modular code is composed of a plurality of synchronous and asynchronous modular elements. The framework system modifies the modular code using a modular element, and automatically modifies the software code based on the modified modular code.

19 Claims, 8 Drawing Sheets

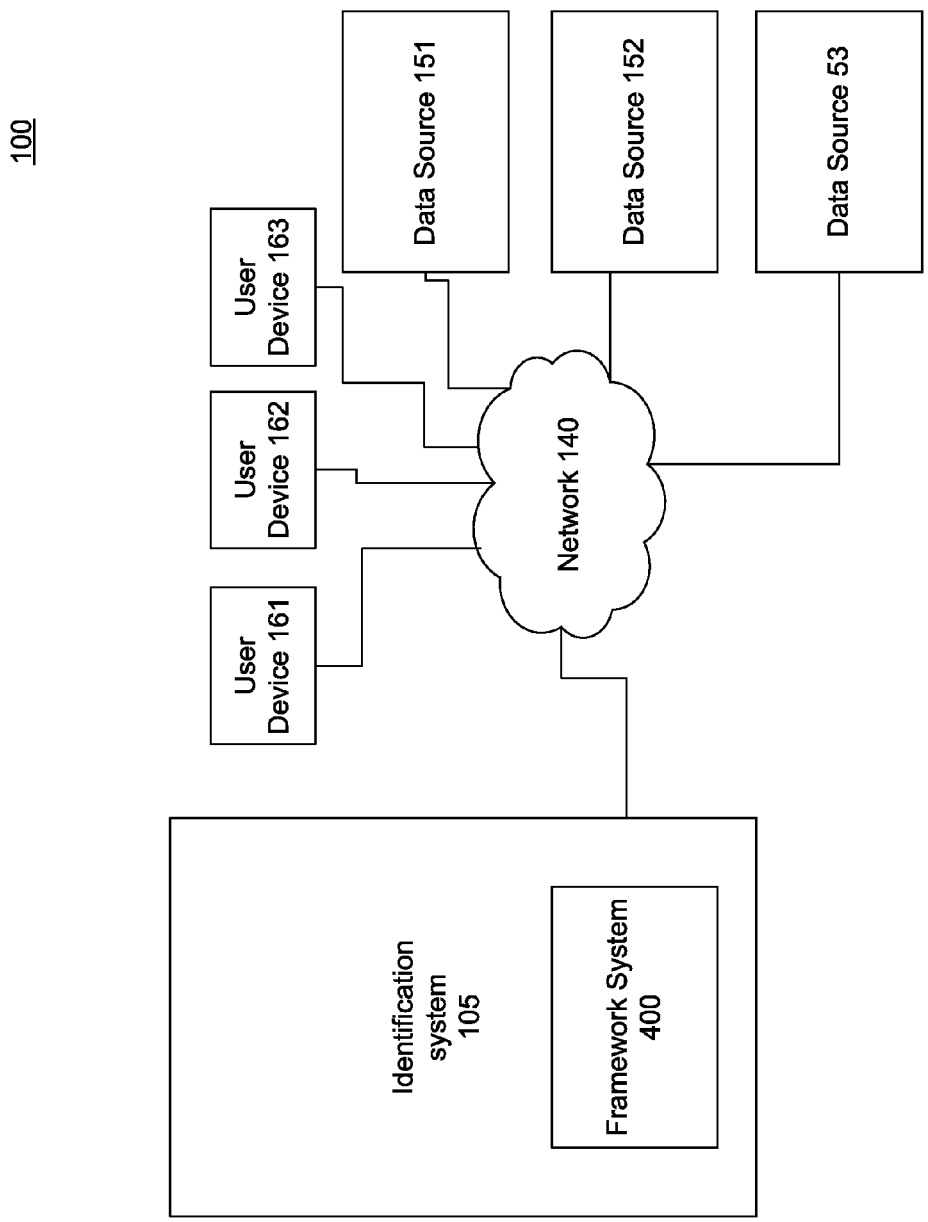

METHOD AND FRAMEWORK FOR SOFTWARE DEVELOPMENT

BACKGROUND

Since the early 1990's, the number of people using the World Wide Web and the Internet has grown at a substantial rate. As more users take advantage of the services available on the Internet by registering on websites, posting comments and information electronically, or simply interacting with companies that post information about others (such as online newspapers), more and more information about the users is available. There is also a substantial amount of information available in publicly and privately available databases, such as LEXISNEXIS. Sending a query to the one or more of the above resources, using the name of a person or entity and other identifying information, can return highly dimensional data sets that occupy large amounts of memory. The large data sets can consume excessive system resources to process or can even be large enough that it is not feasible to contain the data set in virtual memory.

Software developed to process queries in such systems can consist of large amounts of code that can exist in a single file. The file can be extremely large, containing thousands of line of code, which can make modification of such code difficult. Additionally, software structures within the file can involve synchronous or asynchronous execution of a particular job. In particular, for asynchronous execution of the job, the identification and modification of these structures can be problematic.

Additionally, flow control programming structures often require normalization of files so they can be passed to different machines. This normalization process can act as significant overhead for the system, especially, when large numbers of files are being passed.

BRIEF DESCRIPTION OF THE DRAWINGS

FIG. 1 shows, in block diagram form, an exemplary framework system.

DESCRIPTION OF THE EMBODIMENTS

Figure 2A:
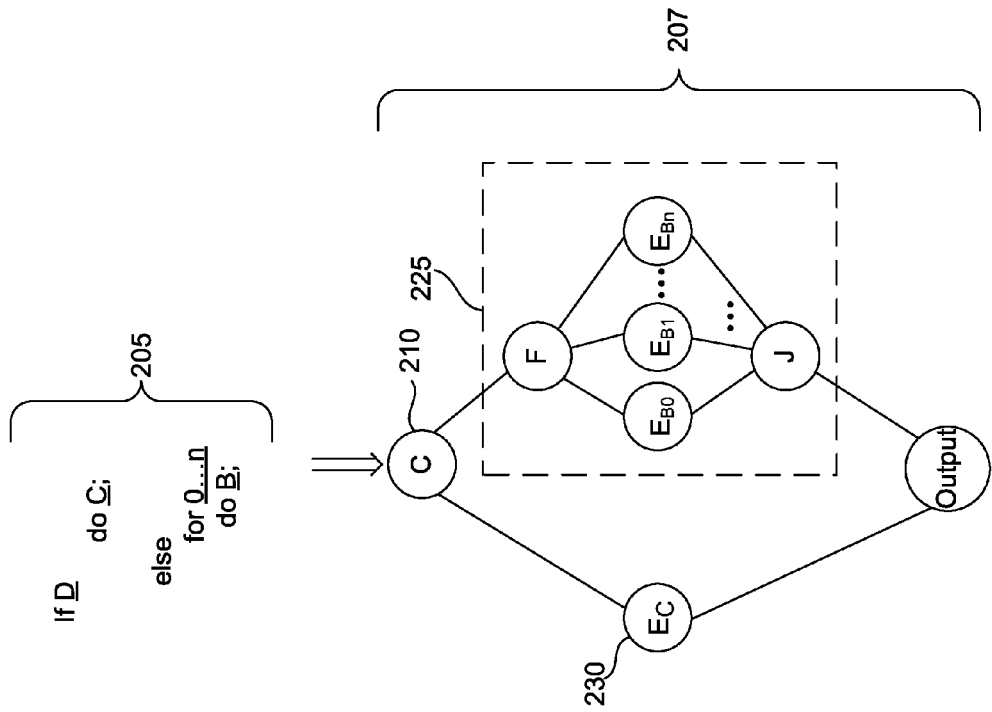
FIG. 2A is an exemplary application of the system depicted in FIG. 1.

Reference will now be made in detail to the present exemplary embodiments illustrated in the accompanying drawings. Wherever possible, the same reference numbers will be used throughout the drawings to refer to the same or like parts.

The example embodiments provided below describe a framework system and method that separates execution flow and data flow in a given program. The framework system is configured to convert software code into modular code including one or more modular elements. The modular code is a graphical representation of the software code's execution flow. The framework system enables modification of the modular code by the user. Any changes to modular code cause the framework system to automatically update the associated software code. Additionally, the framework system enables execution of jobs in synchronous mode, asynchronous mode, or a combination thereof.

FIG. 1 is a block diagram depicting an exemplary system 100 for creating, modifying, and executing modular code. The system 100 can include user devices 161, 162, and 163, data sources 151, 152, and 153, network 140, and identification system 105. System 100 can be configured to search both structured and unstructured data. Unstructured data is data that does not fit well into a pre-defined data model. Structured data can be organized in a structure so that it is identifiable. For example, one form of structured data is a database like SQL™ or Microsoft Access™. SQL™ allows the selection of specific pieces of information based on columns and rows in a field, e.g., rows containing a particular date or ZIP code or name. Structured data is organized and searchable by data type within the actual content. In contrast, unstructured data has no identifiable structure. Examples of "unstructured data" can include books, journals, documents, metadata, health records, audio, video, log, files, and text such as the body of an e-mail message, Web page, or word processor document.

One or more user devices 161, 162, and 163 can be coupled to the identification system 105 via the network 140 or some other coupling. User be coupled to identification system 105 via one or more user devices 161, 162, or 163. A user device 161, 162, and 163 can be, for example, personal computers, personal data devices, mobile device (cellular phones, tablet, laptop, etc.), telephones, or other devices coupled to identification system 105 via network 140. Additionally, in some embodiments (not shown) users can directly operate identification system 105 (e.g., the user's personal computer can embody the identification system 105). While portions of the specification may only refer one user device 161, 162, or 163, this has been used for simplification purposes only and, unless noted otherwise, is not meant to limit the described embodiments in any way.

Data sources 151, 152, and 153 can be proprietary database containing information about one or more users. Data sources 151, 152, and 153 can be "blogs" or websites, such as social networking websites or news agency websites. Data sources 151, 152, and 153 can be private party websites, company websites, or cached information stored in a search database, such as those maintained at Google™ or Yahoo™. Data sources 151, 152, and 153 can be a criminal database or listing, a credit agency data source, an insurance database, or any electronic or other source of information about any user. There can be any number of data sources 151, 152, and 153. While portions of the specification can only refer to only one data source 151, 152, and/or 153, this has been used for simplification purposes only and, unless noted otherwise, is not meant to limit the described embodiments in any way. The documents resulting from the search can relate to a person, organization, or other entity and can include web pages, emails, Microsoft Word™ documents, plain text files, encoded documents, or any other appropriate form of unstructured electronic information.

Network 140 can be, for example, the Internet, an intranet, a local area network, a wide area network, a campus area network, a metropolitan area network, an extranet, a private extranet, any set of two or more coupled electronic devices, or a combination of any of these or other appropriate networks.

Identification system 105 can include one or more processors (not shown), a memory (not shown), and a data interface (not shown). The processor(s) can be a single or multiple microprocessors, field programmable gate arrays (FPGAs), or digital signal processors (DSPs) capable of executing particular sets of instructions. Computer-readable instructions can be stored on a non-transitory computer-readable medium, such as a flexible disk, a hard disk, a CD-ROM (compact disk-read only memory), and MO (magneto-optical), a DVD-ROM (digital versatile disk-read only memory), a DVD RAM (digital versatile disk-random access memory), or a semiconductor memory. Alternatively, the methods can be implemented in hardware components or combinations of hardware and software such as, for example, ASICs, special purpose computers, or general purpose computers. Identification system 105 can be implemented on a single computer, or can be distributed across a plurality of computers. Identification system 105 can be coupled to multiple data sources, for example, data sources 151, 152, and 153 either via network 140 or via other coupling.

Identification system 105, for example, has a framework system 400 and can be in communication with users 161, 162, 163, and data source 151, 152, and 153, via network 140. Framework system 400 can include one or more processors (not shown), a memory (not shown). The processor(s) can be a single or multiple microprocessors, field programmable gate arrays (FPGAs), or digital signal processors (DSPs) capable of executing particular sets of instructions. Computer-readable instructions can be stored on a tangible non-transitory computer-readable medium, such as a flexible disk, a hard disk, a CD-ROM (compact disk-read only memory), and MO (magneto-optical), a DVD-ROM (digital versatile disk-read only memory), a DVD RAM (digital versatile disk-random access memory), or a semiconductor memory. Alternatively, the methods can be implemented in hardware components or combinations of hardware and software such as, for example, ASICs, special purpose computers, or general purpose computers. Framework system 400 can be implemented on a mobile device, a computer (for example identification system 105), distributed across a plurality of computers, or some combination thereof. For example, in some embodiments (not shown) framework system 400 can be distributed across the user devices 161, 162, and 163, and identification system 105.

FIG. 2A illustrates a synchronous example of how framework system 400 converts software code into modular code including one or more modular elements. The modular code is a graphical representation of the software code's execution flow. Software code 205, provides the instruction to do "A" if condition "D" is met, and if condition "D" is not met, then do "B" from "0 . . . n." Framework system 400 converts software code 205 to modular code 207. In this example, all the module elements included within modular code 207 are synchronous. The designation and functionality of module elements are discussed below in detail with reference to FIG. 3.

Figure 2B:
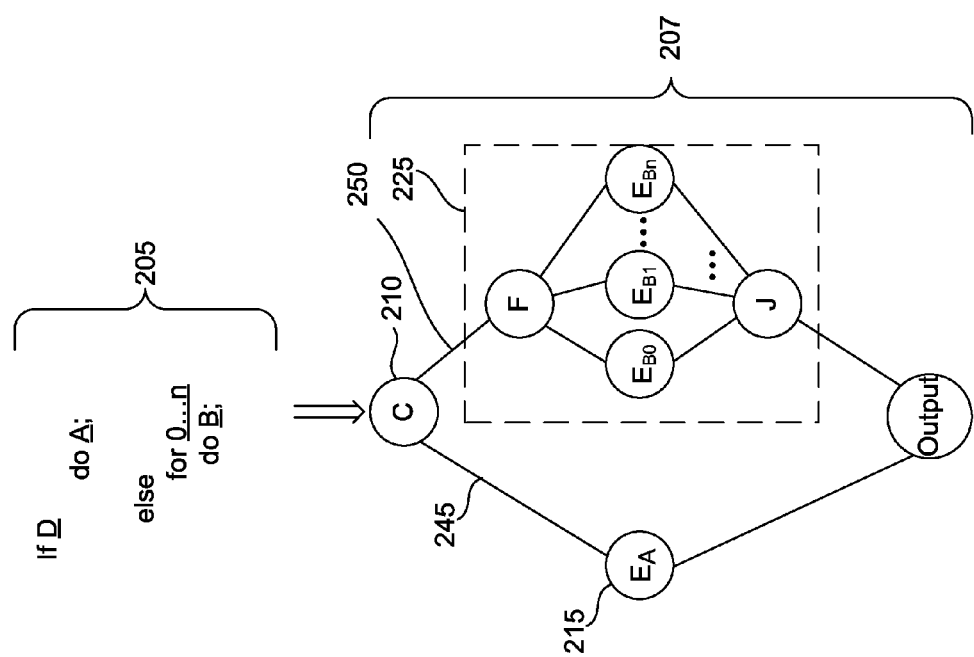
FIG. 2B is an exemplary application of the system depicted in FIG. 1.

Modular code 207 is a modifiable graphic representation of software code 205, such that framework system 400 automatically modifies software code 205 in response to modifications to modular code 207. For example, the condition "D" is represented by a condition element 210, designated by "C." Do "A" is represented by each element 215, designated by "$E_A$," where "E" refers to the each element and the subscript refers to the item ("A") being processed. Do "B" from "0 . . . n" is represented by an element structure 225. The modularity can make it easier to modify the code structures. For example, if the user wants to change software code 205 such that instead of doing "A" if condition "D" is met, it does "C" if condition "D" is met, the user merely needs to replace each module 215 with each module 230 designated by "$E_C$," where "E" refers to the each element and the subscript refers to the item ("C") being processed as illustrated in FIG. 2B. Framework system 400 then automatically updates software code 205 in accordance with the change to modular code 207. In some embodiments, framework system 400 updates modular code 207 if the user makes changes to software code 205.

Additionally, as noted above all the module elements in FIGS. 2A and 2B are synchronous, however, one or more of the module elements can be replaced with one or more asynchronous elements. For example, the plurality of each elements within element structure 225 can be replaced with asynchronous each elements. This would allow framework system 400 to execute $E_{B0}$, $E_{B1}$, etc, in parallel.

Figure 3:
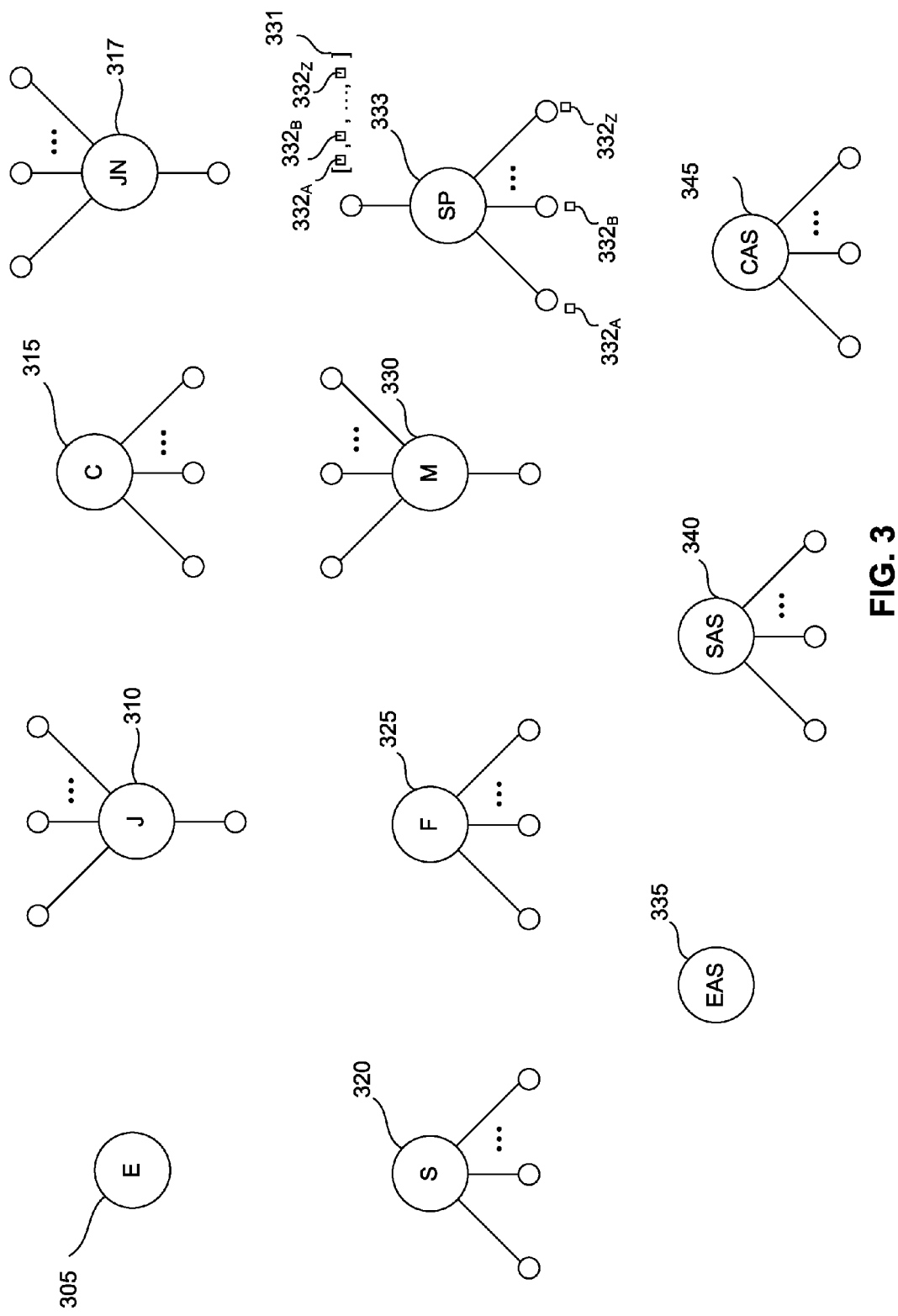
FIG. 3 illustrates some exemplary module elements used to modularize software code.

Framework system 400 can convert software structures into one or more module elements. FIG. 3 illustrates some exemplary module elements used to modularize software code. Some of the module elements can be synchronous and others can be asynchronous. Synchronous execution means that jobs are processed as part of the current processing thread. For example, this occurs when a series of jobs are to be processed and all are part of the same thread. In this example, framework system 400 executes jobs in a first-in first-out fashion, thus a job at the head of the queue is processed before the second job in the queue, the second job is processed before the third job, and so on. In contrast, in asynchronous operation jobs are processed as part of the different processing threads, and the processing may occur either locally or remotely. Asynchronous operation allows framework system 400 to process a plurality of jobs in parallel. Thus, asynchronous operation may result in concurrency at scale and assist with processing power being distributed among available resources. Asynchronous processing can also decouple the execution flow between different processing modules.

Module elements can include an each element 305, a join element 310, a condition element 315, a junction element 317, a select element 320, a fork element 325, a merge element 330, a split element 333, an asynchronous each element 335, an asynchronous select element 340, an asynchronous condition element 345, etc., or some combination thereof. This listing of module elements is not exhaustive, and can include additional module elements.

Each element 305 represents any abstract type of processing which can include, for example, an in-memory function call, a system call, a database transaction, a external service call (LAN, WAN or Internet), or some combination thereof. Additionally, each element 305 can perform logic execution. Moreover, when an each operation is performed asynchronously, asynchronous each element 335 can be used. Condition element 315 is a synchronous module element that corresponds to a conditional code structure that has a plurality of children, but canonly selects a single path. For example, in FIG. 2A, conditional element 210 had two children, each element 215 and element structure 225, however, only path 245 or 250 is selected depending on whether condition "D" is met. Additionally, when a condition operation is performed asynchronously, asynchronous condition element 345 can be used. Junction element 317 is a synchronous module element that allows zero or more contexts to flow through to a particular path. In contrast, join element 310 is a synchronous module element that actually joins a set of contexts into a collection again so that one context flows down a single path. An example of join element 310 in operation is seen at module element 845 of FIG. 8. In contrast, merge element 330 is a synchronous module element that joins a plurality of paths containing duplicate data. An example of merge element 330 in operation is seen at module element 825 of FIG. 8. Fork element 325 is a synchronous module element that duplicates data and sends it to each child along all data paths. An example of fork element 325 in operation is seen at module element 805 of FIG. 8. Select element 320 is a synchronous module element that contains a plurality of paths, however, select element 320 can select one or all paths. Additionally, when a select operation is performed asynchronously, asynchronous select element 340 can be used. Split element 333 is a synchronous module element that provides the ability to do operations on each individual constituent of a collection of abstract items. In some embodiments, split element 333 receives one main context 331 that is composed of a plurality of sub-contexts (or sub-jobs) 332$_A$, 332$_B$, etc., and split element 333 passes each sub-context 332$_A$, 332$_B$, etc., down to a separate single child. An example of split element 333 in operation is seen at module element 835 of FIG. 8.

Figure 4:
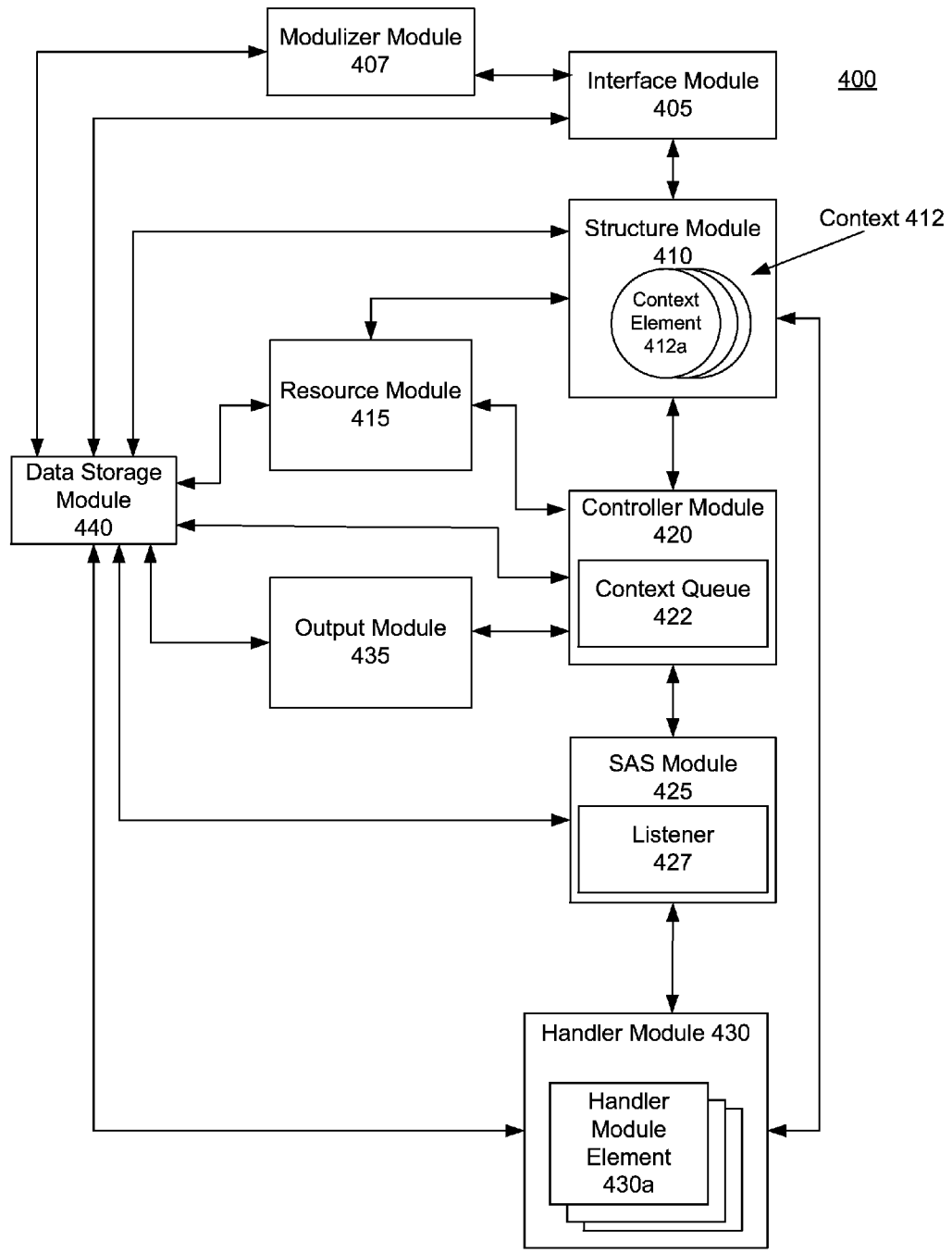
FIG. 4 shows, in block diagram form, an exemplary framework system for editing and executing software composed of software code.

FIG. 4 is a block diagram depicting an exemplary framework system 400 for creating, modifying, and executing software code. Framework system 400 is agnostic with respect to data type and any processing that occurs. Framework system 400 treats the module elements (e.g., each element 305, asynchronous each element 335, fork element 325, etc.) as processing blocks that are associated with corresponding portions of software code. Framework system 400 can modularize various types of software code, including for example code for, text processing, image processing, audio processing, statistical analysis, machine learning, feedback loops, mathematical computation, or any combination thereof. Framework system 400 can include an interface module 405, modulizer module 407, a structure module 410, a resource module 415, a controller module 420, a synchronous/asynchronous (SAS) module 425, a handler module 430, output module 435, and a data storage module 440.

Interface module 405 is a hardware component, a software program, or a combination thereof configured to receive data from the network, for example data from one or more users 161-163 or one or more data sources 151-153. As discussed below with reference to FIG. 5, interface module 405 candisplays a graphical user interface (GUI) to one or more users, illustrating a graphical representation (modular code) of a portion of the software code. Additionally, in some embodiments, interface module 450 is configured to display the entire software code as modular code. Interface module 405 is configured to allow one or more users to modify the modular code using one or more module elements (e.g., each element 305, Join element 310, condition element 315, junction element 317, select element 320, fork element 325, merge element 330, split element 333, asynchronous each 335, asynchronous select element 340, asynchronous condition element 345, etc.). Additionally, interface module 405 allows users to delete or add one or more modules included in the modular code. User input to modify the modular code generates a modification request. The modification request is communicated to modulizer module 407, which performs the modification of the modular code. In some embodiments, interface module 405 displays to the user the software code and allow the user to manually edit the text of the software code.

Figure 5:
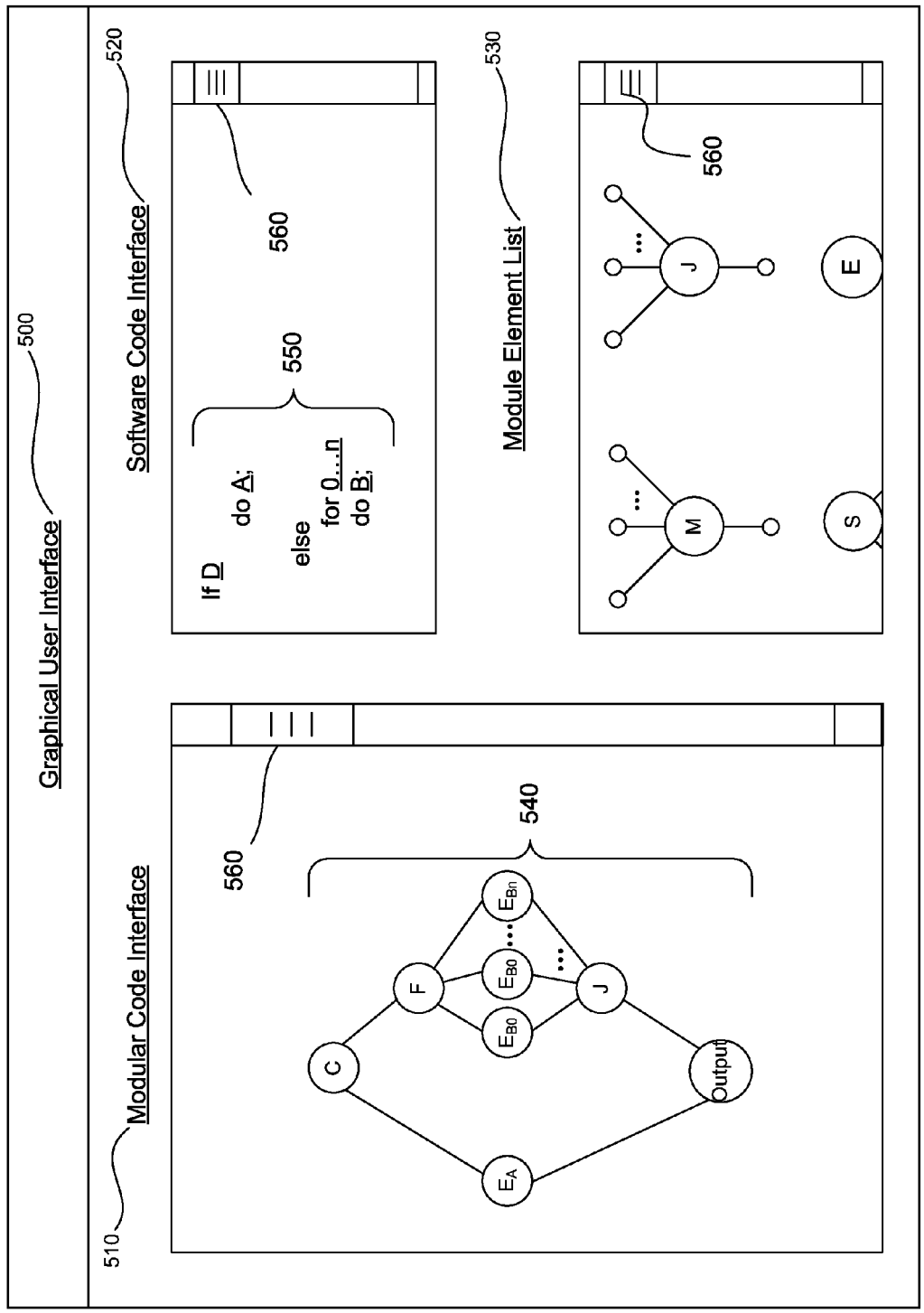
FIG. 5 illustrates an exemplary graphical user interface.

FIG. 5 illustrates an exemplary graphical user interface (GUI) 500 generated by interface module 405. GUI 500 provides an interface for a user to modify the modular code and the associated software code. GUI 500 can include a modular code interface 510, a software code interface 520, and a module element list 530. GUI 500 can be executed by a software command.

Modular code interface 510 displays one or more portions of modular code 540. In some embodiments, modular interface code 510 is configured to display modular code 540 in its entirety. The portion of modular code 540 displayed via modular code interface 510 can be part of a much larger program. In some embodiments, modular code interface 510 is configured to display a plurality of different portions of the modular code. Modular code interface 510 displays modular code 540 that is a graphic representation of software code 550. Modular code interface 510 enables modification of modular code 540 by a user. For example, GUI 500 enables a user to delete, add, modify, or any combination thereof, module elements associated with modular code 540. Any changes to modular code 540 cause framework system 400 to automatically update software code 550. Additionally, modular code interface 510 allows synchronous module elements, asynchronous module elements, or a combination thereof to be included in modular code 540. Modular code interface 510 can include one or more scroll bars 560 that allow a user to scroll through the entire modular code. In some embodiments, as the user scrolls through the modular code, software code interface 520 automatically updates the software code displayed such that it displays the software code associated with the modular code displayed by modular interface 510. Additionally, in some embodiments, the user selects a particular module element or group of elements (element structure) within modular code 540. In some embodiments, when a particular element or element structure is selected software code interface is configured to display software code associated with the selected element or element structure.

GUI 500 also includes a software code interface 520. Software code interface 520 is configured to display one or more portions of the entire software code, for example, software code 550. Software code interface 520 is displaying software code 550 that is associated with modular code 540. Software code interface 520 enables modification of software code 550 by the user. For example, GUI 500 enables a user to delete, add, modify, or any combination thereof, lines of code associated with software code 550. Any changes to software code 550 cause framework system 400 to automatically update modular code 540. Software code interface 520 can include one or more scroll bars 560 that allow a user to scroll through the entire software code. In some embodiments, as the user scrolls through the software code, modular code interface 510 automatically updates the modular code displayed such that it displays the modular code associated with the software code displayed by software code interface 520.

GUI 500 also includes a module element list 530. Module element list 530 includes one or more selectable module elements. The module elements can include an each element 305, join element 310, condition element 315, junction element 317, select element 320, fork element 325, merge element 330, split element 333, asynchronous each 335, asynchronous select element 340, asynchronous condition element 345, etc., or some combination thereof. This listing of module elements is not exhaustive, and can include additional module elements. In some embodiments module elements can be selected and dragged and then dropped into modular code interface 510 to modify modular code 540. In some embodiments, once a particular module element or modular structure is added, software code interface 520 automatically displays software code associated with the modular element or modular structure. For example, if a user added a condition element 315 to modular code 540, software code interface 520 can automatically display the associated software code and prompt the user to enter the associated condition.

Interface module 405 can include an Internet web server, such as Apache Tomcat™, Microsoft's Internet Information Services™, or Sun's Java System Web Server™. Additionally, interface module 405 may also read changes from the file system, from and external service, a source code repository, or some combination thereof. In some embodiments, interface module 405 exposes a service interface that other programs can use to directly communicate with framework system 400. In some embodiments, interface module 405 is combined with output module 435. Interface module 405 is coupled to one or more of modulizer module 407, structure module 410, and data storage module 440.

Modulizer module 407 is a hardware component, a software program, or a combination thereof configured to automatically modify existing software code based on edits made to the associated modular code in interface module 405. Additionally, modulizer 407 can be configured to automatically modify existing modular code based on edits made to the associated software code in interface module 405. In some embodiments, the software code or modular code being accessed by modulizer module 407 is stored in data storage module 440. Additionally, modulizer module 407 is configured to create modular code based on received software code. For example, a user can upload software code via interface module 405 and modulizer module 407 creates modular code based on the uploaded code. Modulizer module 407 is coupled to one or more of interface module 405 and data storage module 440.

Structure module 410 is a hardware component, a software program, or a combination thereof configured to store one or more context elements 412. Context elements 412 represent jobs that need to be completed by framework system 400. For example, one or more handlers can use the information within a context element 412a to perform an internet search on the name "Jane Doe" using multiple search engines (e.g., GOOGLE™ and Yahoo!™). Structure module 410 can also provide access control, routing and persistence to allow system recovery for system robustness. In some embodiments, structure module 410 is distributed across many physical machines. Structure module 410 is coupled to one or more of interface module 405, resource module 415, controller module 420, handler module 430, and data storage module 440.

Resource module 415 is a software module that interfaces with the hardware (e.g., a central processing unit, not shown) and thread pool (not shown) of identification system 105 to determine if system resources are available to execute context elements 412. The thread pool can include a number of threads that are executed by a processor (e.g., central processing unit) to perform a number of tasks. Resource module 415 determines if there is any context 412 that needs processing, and then identifies if system resources are available for processing by framework system 400. If both of these initial conditions are met, resource module 415 communicates to controller module 420 to begin job execution. Resource module 415 is coupled to one or more of structure module 410, controller module 420, and data storage module 440.

Controller module 420 is a hardware component, a software program, or a combination thereof that generally controls the order of job execution in framework system 400. Controller module 420 includes a context queue 422 that identifies which context 412 is in need of processing, and the order in which processing of one or more context 412 begins. For example, context 412 can include context elements 412a, 412b, and 412c (not shown). Controller module 420 is configured to execute context 412 synchronously or asynchronously. Context queue 422 contains an ordered list of one or more pointers to context 412. If purely synchronous, the order of job completion corresponds to the order of pointers listed in context queue 422. In some embodiments, framework system 400 can also execute asynchronous elements or combinations of synchronous and asynchronous elements. In these cases, the order of job completion does not necessarily correspond to the order of processing listed in context queue 422.

Once context element 412a is identified as the next in line for processing, controller module 420 calls SAS module 425 to process the identified context 412 (e.g. context element 412a). Controller module 420 then passes the pointer from context queue 422 corresponding to the job associated with context element 412a to SAS module 425. Once context element 412a has been processed, controller module 420 receives any resulting output from SAS module 425. In some embodiments, controller module 420 sends the resulting output to output module 435. Additionally, in some embodiments, controller module 420 updates context queue 422 with information that context element 412a has been processed. Controller module 420 can then select the next job in context queue 422, context element 412b (not shown), for processing.

Controller module 420 is configured to execute data both synchronously and asynchronously. When executing an asynchronous element associated with context 412 (e.g., context element 412b), controller module calls SAS module 425 to process the identified context 412b. Controller module 420 then passes the pointer from context queue 422 corresponding to the job associated with context element 412b to SAS module 425. In this embodiment, controller module 420 receives a return request from SAS module 425. A return request notifies controller module 420 that context element 412b is currently being processed. Controller module 420 then references context queue 422 to identify the next job to be processed, for example, context element 412c (not shown), and framework system 400 begins processing context element 412c concurrent with context element 412b. Once context element 412b or 412c have been processed, controller module 420 receives any resulting output from SAS module 425. In some embodiments, controller module 420 is configured to send the resulting output to output module 435. Controller module 420 is coupled to one or more of structure module 410, resource module 415, SAS module 425, output module 435, and data storage module 440.

SAS module 425 is a hardware component, a software program, or a combination thereof configured to receive jobs from controller module 420. SAS module 425 is configured to receive one or more pointers from controller module 420. SAS module 425 is configured to call handler module 430 to process the received job. SAS module 425 can be configured to pass the received one or more pointers to handler module 430. For synchronous execution, SAS module 425 is configured to wait for a job complete notice before notifying controller module 420 that the job is complete.

In some embodiments, SAS module 425 includes one or more listeners 427. Listener 427 is configured to monitor handler module 430 to determine if a job being executed asynchronously (e.g., context element 427b) has been completed. If listener 427 determines that the asynchronous job has been completed it notifies controller module 420. Additionally, in some embodiments SAS module 425 can directly update context queue 422. SAS module 425 is coupled to one or more of controller module 420, handler module 430, and data storage module 440.

Handler module 430 is a hardware component, a software program, or a combination thereof configured to receive and execute one or more jobs from SAS module 425. Handler module is configured to receive one or more pointers from SAS module 425. Handler module 430 is configured to utilize the one or more pointers to directly access and execute the associated context 412 (e.g., content element 412a). Handler module 430 can include one or more handler module elements (e.g., handler module element 430a, handler module element 430b (not shown), etc.). In some embodiments the one or more handle elements exist locally and perform the required data transformation and call on the local machine or a remote server, or a plurality of remote servers. Additionally, in some embodiments, the one or more handler elements can exist on one or more remote servers and receive a context to be processed from the local machine.

Handler module 430 can operate synchronously or asynchronously. For synchronous operation, handler module 430 processes each job sequentially. For example, handler module 430 would process context element 412a, and then context element 412b, and so on, until all the jobs in context queue 422 have been completed. Once a job is complete, handler module 430 is configured to send a job complete notice to SAS module 425. For asynchronous operation, when handler module 430 receives a job, it automatically tasks a handler module element (e.g., handler module element 430a) with processing the job. Additionally, handler module 430 sends a return to SAS module 425, notifying SAS module 425 that the job has been received and is currently being processed. If another job is received before handler module element 430a has finished processing its job, handler module 430 is configured to automatically task an additional handler module element 430b (not shown) to process the received job. In some embodiments, handler module elements 430a, 430b, etc., can simply be processing threads run on the same platform as framework system 400. In some embodiments, handler module elements 430a, 430b, etc., are separate systems connected to framework system via a network (e.g., intranet or internet (e.g., network 140)). Handler module is coupled to one or more of structure module 410, SAS module 425, and data storage module 440.

Output module 435 is a hardware component, a software program, or a combination thereof configured to transmit data, via network 140, from framework system 400 to one or more users devices 161, 162, and 163. The output information can be displayed to the user through the user's associated user device 161, 162, or 163. In some embodiments, output module 435 can display the results to a human operator who can modify, correct, or alter the information, or to any other system or agent capable of interacting with the information, including an artificial intelligence system or agent (AI agent), before sending it to the user. Output module 435 is coupled to one or more of controller module 422 and data storage module 440.

Data storage module 440 can comprise a random access memory (RAM), a read only memory (ROM), a programmable read-only memory (PROM), a field programmable read-only memory (FPROM), or other dynamic storage device for storing information and instructions to be used by interface module 405, modulizer module 407, structure module 410, resource module 415, controller module 420, SAS module 425, handler module 430, and output module 435. For example, data storage module 440 can store data received by interface module 405. Data storage module 440 can also include a database, one or more computer files in a directory structure, or any other appropriate data storage mechanism such as a memory. In some embodiments, data storage module 440 is distributed across a plurality of different data storage mechanisms. Data storage module 440 is coupled to one or more of interface module 405, modulizer module 407, structure module 410, resource module 415, controller module 420, SAS module 425, handler module 430, and output module 435.

The coupling between modules, or between modules and network 140, can include, but is not limited to, electronic connections, coaxial cables, copper wire, and fiber optics, including the wires that comprise network 140. The coupling can also take the form of acoustic or light waves, such as lasers and those generated during radio-wave and infra-red data communications. Coupling can also be accomplished by communicating control information or data through one or more networks to other data devices. In some embodiments interface module 405, modulizer module 407, structure module 410, resource module 415, controller module 420, SAS module 425, handler module 430, output module 435, and data storage module 440 can be coupled in a manner such that each module is logically connected to all of the other modules in framework system 400.

Each of the logical or functional modules described above can comprise multiple modules. The modules can be implemented individually or their functions can be combined with the functions of other modules. Further, each of the modules can be implemented on individual components, or the modules can be implemented as a combination of components. For example, interface module 405, modulizer module 407, structure module 410, resource module 415, controller module 420, SAS module 425, handler module 430, and output module 435, can each be implemented by a field-programmable gate array (FPGA), an application-specific integrated circuit (ASIC), a complex programmable logic device (CPLD), a printed circuit board (PCB), a combination of programmable logic components and programmable interconnects, single CPU chip, a CPU chip combined on a motherboard, a general purpose computer, or any other combination of devices or modules capable of performing the tasks of modules 405, 407, 410, 415, 420, 425, 430, and 435.

Figure 6:
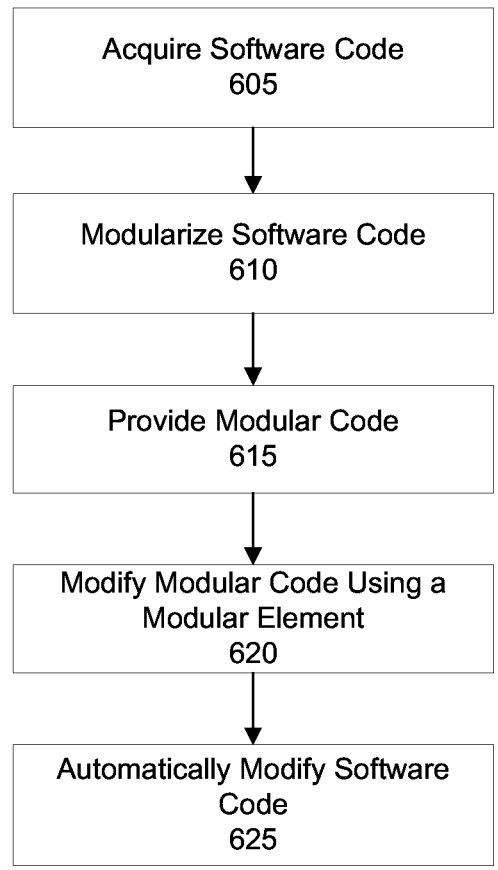
FIG. 6 is a flowchart representing an exemplary method modifying software code via modifying associated modular code using a framework system.

FIG. 6 is a flowchart representing an exemplary method modifying software code via modifying associated modular code using a framework system. In step 605, the software code is acquired. The code can, for example, be uploaded from a memory storage location. Additionally, in some embodiments, one or more users can manually enter the software code.

In step 610, the software code is modularlized, such that the software code is converted into modular code including one or more modular elements. For example, for simple workflows, a standard code analyzer can determine the structure of the execution flow and decompose logical blocks of the software code (such as for loops and non-dependent code which can be executed in parallel) into modular code. Additionally, for highly complicated workflows, a graphical user interface can be used, for example, GUI 500, to have a user aid in the modularization of the software code. The modular code is a graphical representation of the software code's execution flow.

In step 615, the modular code is provided to a user. For example, one or more portions of the modular code can be displayed to a user via a graphical user interface (e.g., GUI 500).

In step 620, the modular code is modified. The modification of modular code can be done using one or more modular elements. Modular elements can, for example, include each element (synchronous and asynchronous), a condition element (synchronous and asynchronous), a join element, a merge element, a fork element, a select element (synchronous and asynchronous), a split element, etc. This listing of module elements is not exhaustive, and can include additional module elements. Modification of modular code includes editing the existing modular code, such as replacing a conditional element in the existing code with one or more modular elements. For example, as discussed above with reference to FIGS. 2A and 2B, where conditional element 215 is replaced with conditional element 230. Modification of modular code includes adding modular elements to the existing modular code. Additionally, modification of modular code includes deleting modular elements from the existing modular code. For example, a user can add a conditional modular element to the modular code by adding the conditional modular element to the existing modular code. In some embodiments, when the modular code is modified, the framework system generates a modification request for the associated software code.

In step 625, the software code is automatically updated based on one or more modifications made in step 620. The software code is updated to reflect the modified functionality presented in the modular code. In some embodiments, the modified functionality is described in a modification request generated by a framework system in response to changes to the modular code. Modifications to the software code can be made based on the changes indicated within the modification request.

Figure 7:
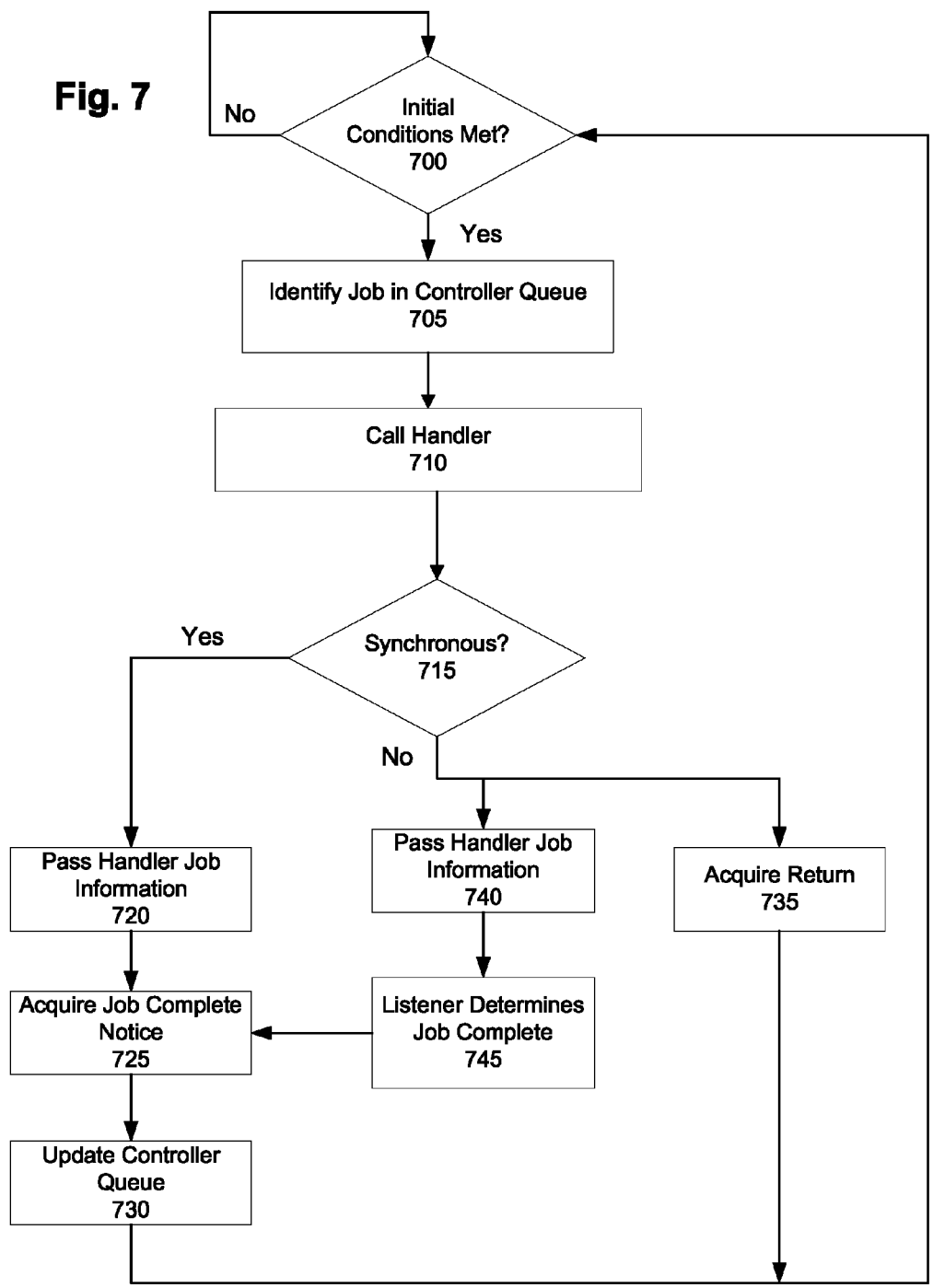
FIG. 7 is a flowchart representing an exemplary method for executing one or more jobs using a framework system.

FIG. 7 is a flowchart representing an exemplary method for executing one or more jobs using a framework system. The framework system operates on one or more servers (e.g., identification system 105). In step 700, the framework system (e.g., framework system 400) determines whether initial conditions have been met. Initial conditions can include having at least one job to process, and system resources available to process the at least one job. The framework system determines if there are any jobs (e.g., content) that need to be processed. If there are one or more jobs (e.g., context elements), the framework system interfaces with the thread pool of the server to determine if system resources are available to execute the identified one or more jobs. The initial conditions are satisfied when there are system resources available and at least one job has been identified for processing.

In step 705, a job in a controller queue is identified to be processed. The controller queue can be configured to contain an ordered list of one or more pointers to context items associated with jobs to be processed.

In step 710, a handler is called to process the identified job. In some embodiments the handler is local to the server. In other embodiments, the handler is operating on one or more separate servers.

In step 715, a determination is made whether the job can be executed synchronously or asynchronously. For example, this determination may be made by referencing the modular code associated with execution of the job. If the job is to be executed synchronously, the job is passed to the called handler (step 720). For example, one or more memory pointers associated with the job can be passed to the called handler. The handler can then process the received job. In step 725, a job completion notice is acquired from the handler when the handler completes processing of its job. In some embodiments, the job completion notice can be acquired in conjunction with an associated output. In step 730, the controller queue is updated with information indicating that the job has been processed. The framework system then proceeds to step 700.

Referring back to step 715, if the job is to be executed asynchronously, in step 740, the job is passed to the called handler and the associated thread is also returned to the thread pool (step 735), freeing it for other uses. In some embodiments, one or more memory pointers associated with the job are passed to the called handler. Because the job is being processed asynchronously, the framework system is able to concurrently process other jobs via one or more additional handlers. A listener monitoring all of the handlers identifies handlers who have completed processing their respective jobs (745). An example of asynchronous operation is described in detail below with reference to FIG. 8. In step 725, a job completion notice is acquired from the handler when it has completed processing of its job. In some embodiments, the job completion notice can be acquired in conjunction with an associated output. In step 730, the controller queue is updated with information indicating that the job has been processed. Framework system then proceeds back to step 700.

Figure 8:
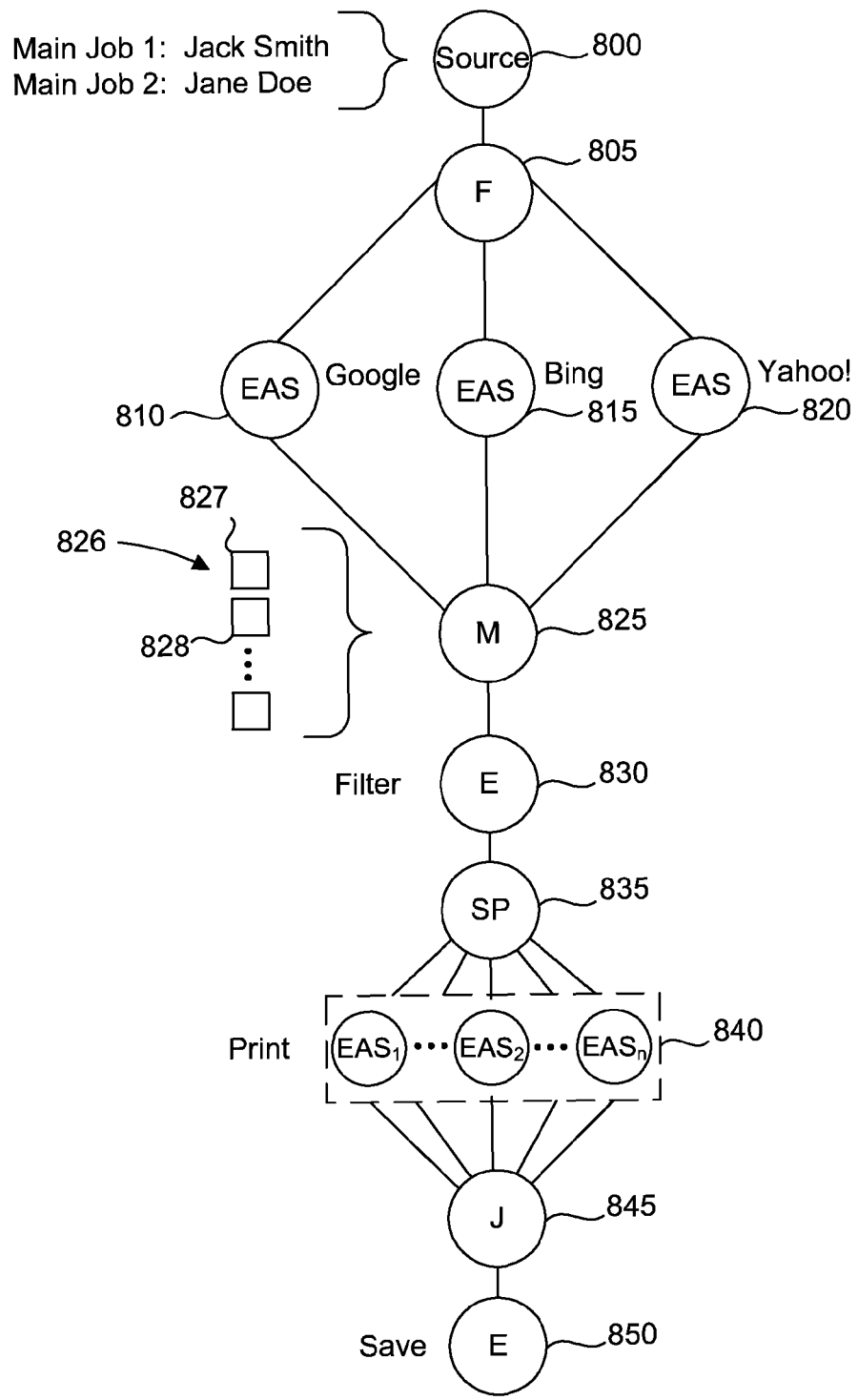
FIG. 8 is an exemplary application of the system depicted in FIG. 1.

FIG. 8 illustrates an exemplary modular graphic representation of code containing both synchronous and asynchronous functionality. The modular code pertains to the execution of two separate jobs. The first job is to perform and process a search query on the name "Jack Smith," and the second job is to perform and process a search query on the name "Jane Doe." In this example, job 1 and job 2 are processed synchronously with respect to each other, however, elements of the processing of each job individually are asynchronous.

The execution flow of the modular code is described using a source element 800, a fork element 805, asynchronous each elements 810, 815, and 820, a merge element 825, an each element 830, a split element 835, a plurality of asynchronous each elements 840, a join element 845, and an each element 850. The modular code is generally executed in a top down fashion and according to how the modular elements are ordered in the modular code. For example, source element 800 is processed first, followed by fork element 805, and so on.

In this example, job 1 is received from source element 800. Job 1 is passed to fork element 805. Fork element 805 distributes job 1 to all three asynchronous each elements 810, 815, and 820. In this example, each of the asynchronous each elements 810, 815, and 820, correspond to an associated internet search engine, specifically, in this example, Google™, Bing™, and Yahoo!™, respectively. Thus, when processing job 1, the framework system would enter the name "Jack Smith" into all three search engines, creating three independent sub-jobs related to job 1. Because the sub-jobs of job 1 are being processed asynchronously, each of the sub-jobs can be processed at the same time. Additionally, due to the asynchronous processing of the sub-jobs, results from each of the search engines can return to the framework system at different times.

Merge element 825 merges the search results from asynchronous each elements 810, 815, and 820, into a single data array 826. Data array 826 can include one or more individual search results (e.g., 826 and 827, etc).

In this example each element 830 is acting as a filter on data array 826. Each element 830 can filter out any duplicative search results. For example, if for job 1, search result 827 and 828 are the same, framework system deletes one of the two search results.

In this example, split element 835 splits the data array out into individual results and passes the results to the plurality of asynchronous each elements 840. Each asynchronous each element, of the plurality of asynchronous each elements 840, is able to handle an associated search result. In this example, the plurality of asynchronous each elements 840 are used to print the individual search results. After which the individual search results are joined back into data array 826 using join element 845.

Data array 826 is then passed to each element 850. In this example, each element 850 is configured to save the data array to one or more memory storage locations.

In this example, after job 1 has been completely processed, the modular code begins processing job 2. Job 2 is executed in a similar manner as the execution of job 1.

Certain adaptations and modifications of the described embodiments can be made. Therefore, the above discussed embodiments are considered to be illustrative and not restrictive. Embodiments of the present application are not limited to any particular operating system, device architecture, server architecture, or computer programming language.

The invention claimed is:

1. A method for modularizing software code, the method performed by a system comprising a processor and a memory storing instructions which, when executed cause the system to perform the method, the method comprising:
  acquiring software code;
  modularizing the software code to create an associated modular code, wherein the modular code is a graphical representation of the execution flow of the software code and is composed of a plurality of synchronous and asynchronous modular elements;
  modifying the modular code using a modular element; and
  automatically modifying the software code based on the modified modular code.

2. The method of claim 1, wherein modifying the modular code includes adding one or more modular elements to the modular code.

3. The method of claim 2, wherein adding one or more modular elements to the modular code is done via a graphical user interface.

4. The method of claim 1, further comprising:
  identifying a first job to be processed;
  calling a first handler to process the job; and
  passing a first pointer associated with the first job to the first handler.

5. The method of claim 4, further comprising:
  identifying a second job to be processed;
  calling a second handler to process the second job, wherein the first handler has not completed processing the first job; and
  passing a second pointer associated with the second job to the second handler.

6. The method of claim 5, wherein the first job and the second job can be sub-jobs of a third job.

7. The method of claim 1, wherein the software code is textual.

8. A non-transitory computer-readable medium comprising program code, the program code being operable, when executed by a computer system, to cause the computer system to perform a method comprising:
  acquiring software code;
  modularizing the software code to create an associated modular code, wherein the modular code is a graphical representation of the execution flow of the software code and is composed of a plurality of synchronous and asynchronous modular elements;
  modifying the modular code using a modular element; and
  automatically modifying the software code based on the modified modular code.

9. The computer readable medium of claim 8, wherein modifying the modular code includes adding one or more modular elements to the modular code.

10. The computer readable medium of claim 9, wherein adding one or more modular elements to the modular code is done via a graphical user interface.

11. The computer readable medium of claim 8, further comprising:
  identifying a first job to be processed;
  calling a first handler to process the job; and
  passing a first pointer associated with the first job to the first handler.

12. The computer readable medium of claim 11, further comprising:
  identifying a second job to be processed;
  calling a second handler to process the second job, wherein the first handler has not completed processing the first job; and
  passing a second pointer associated with the second job to the second handler.

13. The method of claim 12, wherein the first job and the second job can be sub-jobs of a third job.

14. A system comprising:
  one or more processors configured to execute one or more modules; and
  a memory storing the one or more modules, the modules comprising:
    an interface module configured to acquire software code, and
    a modulizer module configured to:
      modularize the software code to create an associated modular code, wherein the modular code is a graphical representation of the execution flow of the software code and is composed of a plurality of synchronous and asynchronous modular elements,
      modify the modular code using a modular element, and
      automatically modify the software code based on the modified modular code.

15. The system of claim 14, wherein modifying the modular code includes adding one or more modular elements to the modular code.

16. The system of claim 15, further comprising a graphical user interface that corresponds with the interface module for adding one or more modular elements to the modular code.

17. The system of claim 14, wherein the one or more modules further comprises:
  a controller module configured to identify a first job to be processed;
  a synchronous/asynchronous module is configured to:
    call a first handler to process the job, and
    pass a first pointer associated with the first job to the first handler.

18. The system of claim 17, wherein:
  the controller module is configured to identify a second job to be processed;
  the synchronous/asynchronous module is configured to:
    call a second handler to process the second job, wherein the first handler has not completed processing the first job, and
    pass a second pointer associated with the second job to the second handler.

19. The system of claim 18, wherein the first job and the second job can be sub-jobs of a third job.

* * * * *